(12) United States Patent
Quintus

(10) Patent No.: US 6,206,797 B1
(45) Date of Patent: Mar. 27, 2001

(54) BELT TENSIONER WITH FLEXIBLE ARMPLATE

(75) Inventor: James G. Quintus, Springfield, MO (US)

(73) Assignee: Dayco Products, Inc., Dayton, OH (US)

( * ) Notice: Subject to any disclaimer, the term of this patent is extended or adjusted under 35 U.S.C. 154(b) by 0 days.

(21) Appl. No.: 09/374,181

(22) Filed: Aug. 13, 1999

(51) Int. Cl.[7] ............................................. F16H 7/12
(52) U.S. Cl. ............................ 474/135; 474/101; 474/111
(58) Field of Search .................................. 474/135, 101, 474/109–111, 113–117, 133, 138, 140

(56) References Cited

U.S. PATENT DOCUMENTS

| | | |
|---|---|---|
| 3,924,483 | 12/1975 | Walker et al. |
| 4,473,362 | 9/1984 | Thomey et al. ............ 474/135 |
| 4,696,663 | 9/1987 | Thomey et al. ............ 474/133 |
| 4,816,011 * | 3/1989 | Kotzab ..................... 474/135 X |
| 4,886,483 * | 12/1989 | Henderson ................ 474/135 |
| 4,889,520 * | 12/1989 | Brandenstein et al. ...... 474/135 |
| 5,288,276 * | 2/1994 | Golovatgai-Schmidt et al. .. 474/133 |
| 5,348,514 * | 9/1994 | Foley ....................... 474/135 |
| 5,993,340 * | 11/1999 | Rocca et al. .............. 474/109 |

* cited by examiner

Primary Examiner—David A. Bucci
Assistant Examiner—Marcus Charles
(74) Attorney, Agent, or Firm—Joseph V. Tassone

(57) ABSTRACT

A belt tensioner includes a stationary spring case receiving a pivotal arm supporting a pulley and biased in a belt-tensioning direction by a spring element. The arm is provided with a surface supporting an armplate bushing having an inner diameter and juxtaposed with an armplate. The armplate has an inner diameter smaller than an inner diameter of the armplate bushing so as, upon radially riveting the armplate to a stationary shaft during assembly of the tensioner, an inner area of the armplate is resiliently bent. The bushing is provided with a taper, so that the respective juxtaposed surfaces of the bushing and armplate extend complimentary to each other upon deflection of the armplate.

24 Claims, 2 Drawing Sheets

FIG. 1
(PRIOR ART)
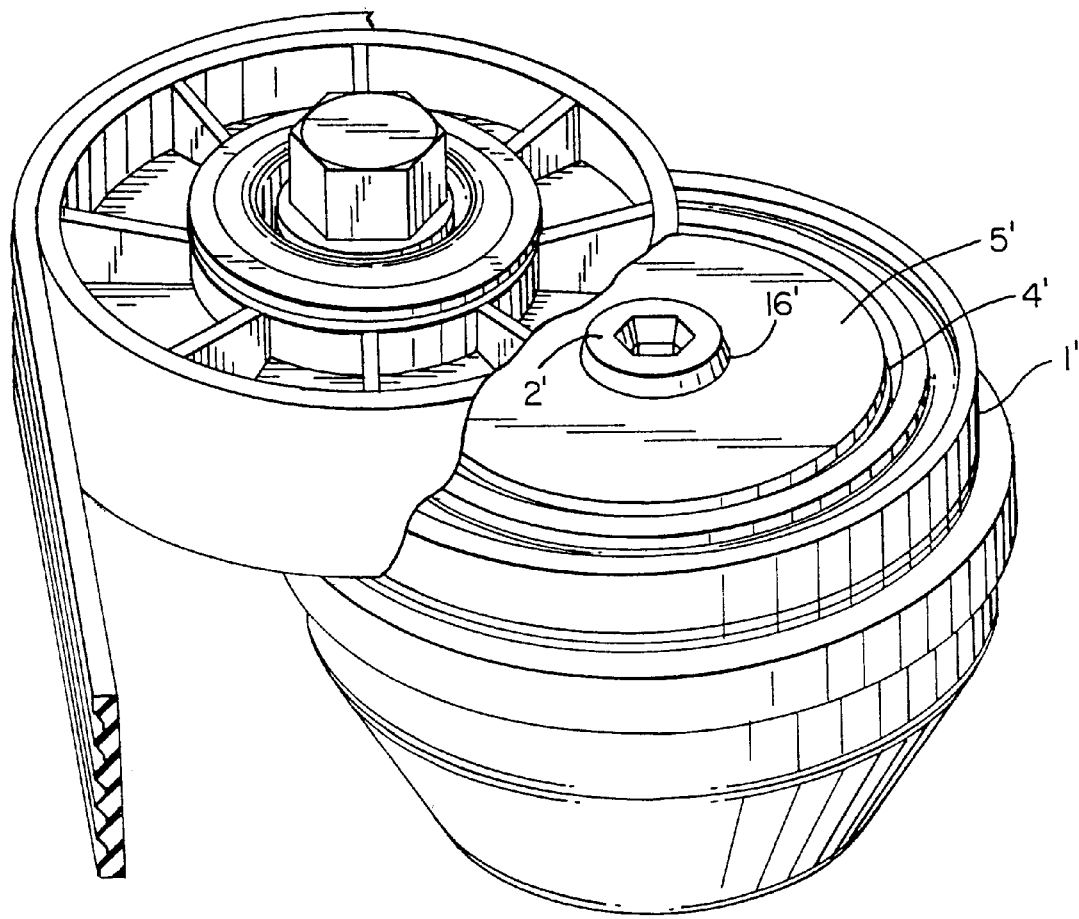
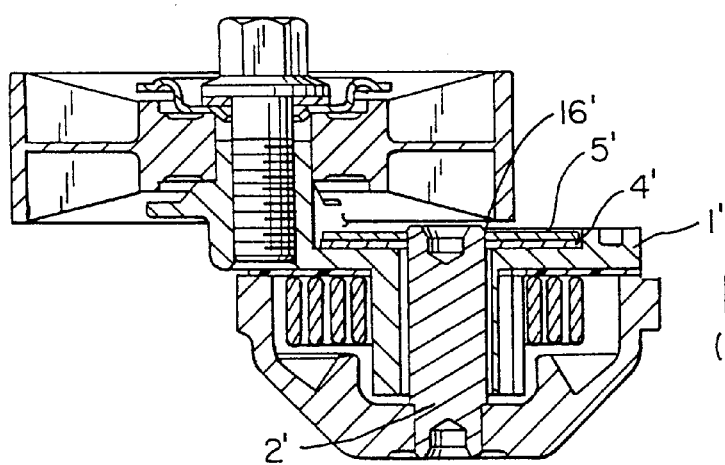
FIG. 1A
(PRIOR ART)

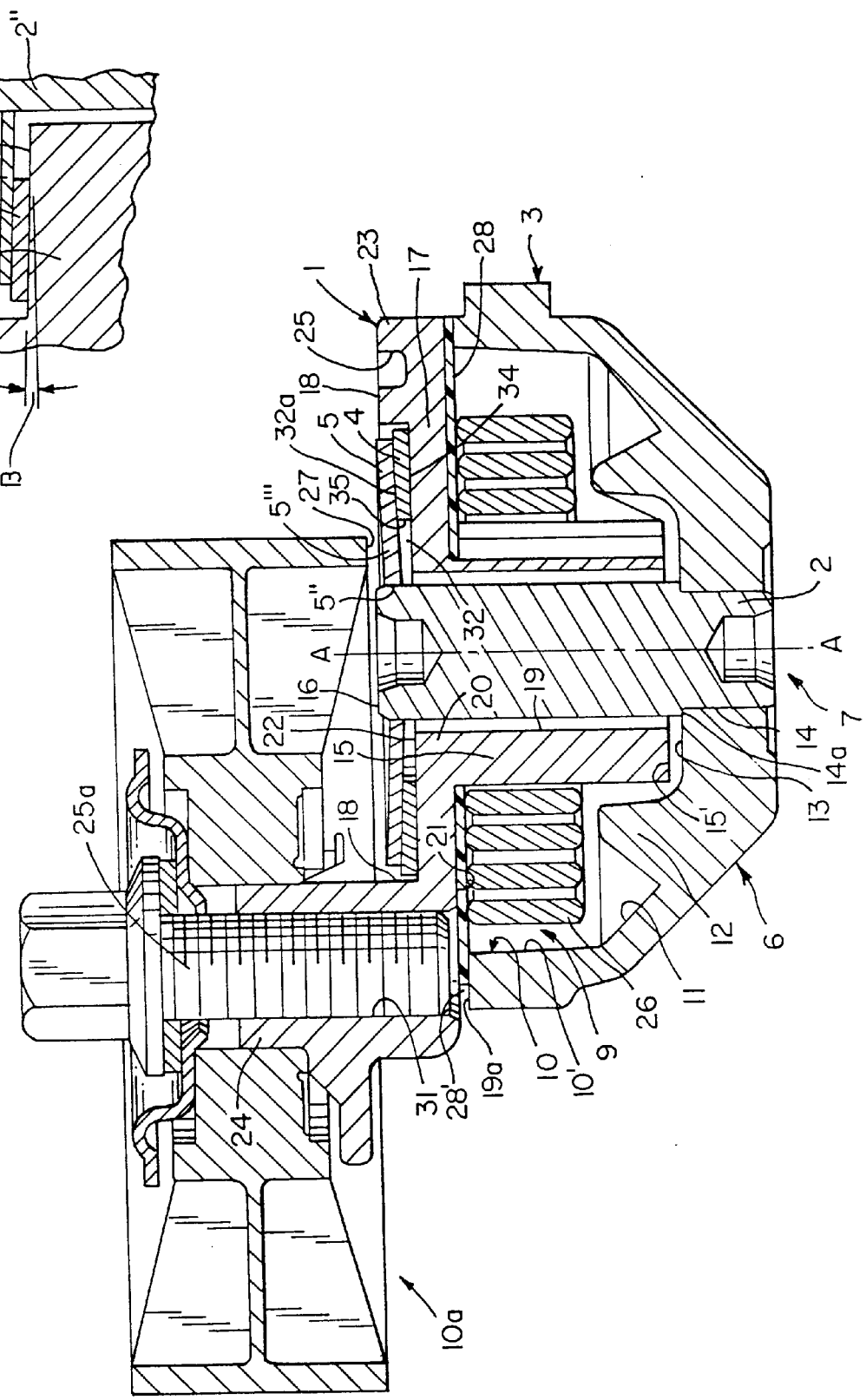

BELT TENSIONER WITH FLEXIBLE ARMPLATE

FIELD OF THE INVENTION

The present invention relates to a tensioning device for power transmission belts and the like, in particular a tensioning device mounted on motor vehicle engines and having a pivotal arm, which supports a pulley and is received in a stationary case, and a means for reliably interconnecting these parts without locking up the tensioning device.

BACKGROUND OF THE INVENTION

It is known to drive various automobile accessory assemblies, for example the water pump, the generator, the fan for cooling the coolant, the power steering pump, and the compressor, by the vehicle engine. This is done by a driving pulley actuated by the engine shaft of the motor vehicle which drives an endless drive belt operating the accessory assemblies through driven pulleys.

Different states of operation of the engine are known in which the belt tension increases pulse-like generating a growing torque on the pivot arm which, in response to varying tension of the belt, may deflect in a direction opposite to a belt tensioning direction. In order to prevent the unnecessary sliding friction between the pivotal arm and the stationary case, the prior art teaches numerous resiliently deformable elements which are disposed between the pivotal arm and the stationary house. Usually, such deformable elements are bushings made of friction materials. Increasing the number of bushings leads to complicated kinematics, which may result in structural damages to the tensioner. Typically, the tensioner may have increased undesirable wear of many frictional parts as a result of tensioning forces exerted by new elements. This brings about tension peaks in the belt, which can exceed the permissible belt tension. Ultimately, all of the above described defects can cumulatively cause undesirably large excursions of the pivotal arm.

Recognizing this problem, the prior art has designed numerous structures of belt tensioners which allow reduced dynamic loads on the main elements of the tensioner. Two basic premises are usually considered during design and assembly of the belt tensioner. First, the ideal assembly has to be tight enough to have all the clearances removed. Second, the ideal assembly must be sufficiently loose to avoid locking up the tensioner.

The structure that has been previously designed is shown in FIGS. 1 and 1A, and as a result of practical observations, is illustrative of the problems inherent in this type of tensioner. The belt tensioner has a disk shaped armplate 5' serving a dual function. First, the armplate 5' holds the assembled tensioner together. Second, the plate removes the clearances between the various components of the tensioner during assembly. The armplate has a wear bushing 4' between it and a tensioner arm 1' as a result of the relative rotational movement that exists between these two components when the tensioner is in operation. Typically, the wear bushing and the armplate have had the same outer and inner diameters. Such dimensions have caused assembly problems due to the dimensional variation of a plurality of components that must be mated together to build a tensioner.

The plate, as known in the art, is customarily attached to the tensioner by one of the following methods:

According to the first method, the armplate 5' is pressed to a shoulder 16' of a shaft 2' and then radially riveted to secure the plate to the shaft. One of negative consequences of such method is poor removal of the clearances in the assembly because the stackup tolerances in the components are so large that the assembly is either pressed too tight together and, therefore, is locked up or, conversely, it is too loose to perform properly.

Pursuant to the other method, the armplate is pressed with a certain force tightly against the armplate bushing 4' and arm 1' to remove all the stackup clearances of the assembly and then is radially riveted to secure it. This approach has not been found entirely satisfactory because the press force is difficult to control and the radial rivet operation tends to push an inner area adjacent to the shaft 2' against the bushing 4' even further and can easily lock the tensioner up.

SUMMARY OF THE INVENTION

It is therefore an object of the present invention to provide a belt tensioner of the type described herein which overcomes the above-discussed drawbacks.

Another object of the present invention is to provide a belt tensioner having a structure including a limited number of clearances.

Still another object of the present invention is to provide a belt tensioner that despite a limited number of clearances, has a tight structure avoiding a possible lockup of the tensioner.

The above and other objects according to the invention are achieved by a belt tensioner which is provided with an armplate made of steel and having inner and outer diameters. An outer area of the armplate terminates at a radial distance from spaced apart stops formed on the arm while an inner area is pressed against a stationary shaft. The armplate is also spaced axially apart from a respective surface of a pivotal arm, which carries a pulley, and forms a gap therewith. The gap, in turn, receives a plate bushing pressed against respective surfaces of the plate and the arm and having an inner diameter substantially larger than the inner diameter of the armplate. Such structure of the plate bushing allows the inner area of the armplate to deflect freely during assembly. The plate bushing is formed with a taper to conform a deflected surface of the plate upon riveting and thus maintains a good wear surface.

An added benefit to deflecting the armplate is that it retains a small amount of "spring back" and, as the bushing surfaces wear out, it is able to compensate for the wear and keep the tensioner firmly together.

Advantageously, the armplate is made of spring steel and is able to create damping which is sometimes desirable.

According to another advantageous feature of the present invention, the respective surface of the pivot arm is formed with a taper while the bushing is manufactured with flat surfaces.

BRIEF DESCRIPTION OF THE DRAWINGS

The above and other objects, features and advantages of the present invention will become more readily apparent from the following detailed description of the preferred embodiment of the invention, references being made to the accompanying drawings, in which:

FIG. 1 is a perspective view of a belt tensioner according to the prior art.

FIG. 1A is a cross-sectional view of the belt tensioner according to the prior art tensioner of FIG. 1.

FIG. 2 is a cross-sectional view in elevation of the belt tensioner according to the invention.

FIG. 3 is a cross-sectional view of a part of the belt tensioner according to another embodiment of the invention.

DETAILED DESCRIPTION OF THE PREFERRED EMBODIMENT

FIG. 2 illustrates an arm tensioning device in accordance with the invention. The arm tensioning device includes a shaft 2 which is mounted on a motor vehicle engine (not show herein) in a known manner and extends along an axis A—A. During assembly of the device, a spring case 3 is fixedly centered on the shaft 2. The spring case 3 has a generally frustoconical cross-section and is formed with a peripheral annular wall 6 tapering toward an inner mounting end 7 of the shaft 2. An inner surface 10 of the peripheral wall 6 defines a compartment 9, which is open axially outwardly to receive a swingable arm 1 carrying a pulley 10a.

The inner surface 10 of the spring case 3 has a portion 10' extending generally parallel to the axis A—A and a portion 11 which tapers axially inwardly. The portion 11 is formed with an annular flange 12 extending axially outwardly and having an inner surface 13 that extends substantially perpendicular to the axis A—A.

The peripheral wall 6 further has an annular radially extending surface 19a facing an inner surface 21 of the arm 1. The inner and outer surfaces 21 and 19a are spaced axially apart so as to form a clearance 28' therebetween which receives a spring bushing 28 covering the spring case 3 and being in contact with both of these surfaces. The spring bushing 28 is preferably made of plastic.

The inner mounting end 7 of the shaft 2 is formed with a part 14 having a reduced diameter and defining a seat 14a which receives the inner portion 13 of the annular flange 12 of the peripheral wall 6.

Understandably, the above-described spring case may have different forms and shapes as long as the requirements of easy assembly and reliability of the device are met.

The compartment 9 receives the swingable arm 1, which is formed with an axially extending hollow sleeve 15 having an inner annular surface 19 that is spaced radially outwardly from the shaft 2. An inner axial end 15' of the hollow 15 sleeve terminates at some distance from the inner portion 13 of the peripheral wall 6. An outer axial end 20 of the hollow sleeve 15 is spaced axially inwardly from an outer axial end 16 of the shaft 2.

Extending radially outwardly from the outer axial end 20 of the hollow sleeve 15 and formed unitarily therewith is a radial flange 17 having the inner surface 21 that faces the compartment 9 and an outer surface 22. An outer radial periphery of the flange 17 has a stop 23 and pulley support 24, which are spaced diametrically apart from each other. The pulley support 24 extends axially outwardly from the flange 17 towards the pulley 10a.

The stop 23 has an inner surface 25 spaced radially outwardly from the outer axial end 16 of the shaft 2 and extending axially outwardly from the outer peripheral surface 22 of the radial flange 17. The pulley support 24 has an axially extending recess 31, which receives a shaft 25a of the pulley 10a swingable with the arm 1 toward a belt (not shown herein).

The compartment 9 of the spring case 3 receives a spring element 26 having one end connected to the swingable arm 1 and the other end connected to the spring case 3. The spring element 26, which presses against the spring bushing 28, applies the tensioning force to the arm 1 so as to bias the arm and the pulley 10a towards the belt. According to the invention, the shaft 2 does not protrude into the volume of the pulley 10a, which has its inner surface 27 spaced axially from the flange 17 of the swingable arm 1.

As shown in FIG. 2, the inner surface 25 of the stop 23 and an inner surface 18 of the support 24 form a radial gap with the shaft 2. This gap receives a disk-shaped armplate 5 pressed by its inner surface 5" against the outer axial end 16 of the shaft 2. Thus, the armplate 5 removes, at least partially, undesirable clearances. The armplate 5 further has its outer periphery terminating at a distance from inner surfaces 25 and 18 of the stop 23 and support 24 respectively. Upon assembling the device, the armplate 5 is also spaced axially from the outer surface 22 of the flange 17 of the arm 1, thereby forming a space 32 with this outer surface 22. Further, during radially riveting the armplate to the outer axial 16 of the shaft 2 its inner surface 5" is bent inwardly. As a result, a region 5'" of the armplate 5 adjacent to the inner surface 5" deflects inwardly and solidifies the whole structure.

The space 32 receives a plate bushing 4 made of friction material and having an outer surface 32a and an inner radially extending surface 34. These outer and inner surfaces of the plate bushing 4 are juxtaposed with an inner surface of the armplate 5 and the outer surface 22 of the flange 17 of the swingable arm 1 respectively, thereby affecting the sliding friction between the rotational and stationary parts of the device.

As mentioned above, the invention attacks two problems stemming from dichotomy inherent in any belt tensioner. First, the device should have a very few clearances between the various rotational and stationary components, thereby providing tightness of the assembly. Second, the tensioner must be loose enough to avoid locking up the pivotal arm.

In order to prevent a lock up, the plate bushing 4 is formed with an outer diameter substantially equal to, but preferably greater than the outer diameter of the armplate 5. The plate bushing 4 is sized to reduce a radial clearance formed between the surfaces 25, 18 of the stop 23 and support 24 respectively and the outer annular surface of the armplate 5 facing these surfaces.

An inner axially extending peripheral surface 35 of the bushing 4 terminates at a substantial distance from the shaft 2, thus making the inner diameter of the annular plate bushing 4 substantially larger than the inner diameter of the armplate 5. In structural terms, the plate bushing 4 terminates in the central region of the armplate 5.

The large inner diameter of the plate bushing 4 allows the region 5" of the armplate 5 to deflect freely during assembly. Upon deflection, the armplate 5 is inclined inwardly with respect to the axis A—A. The plate bushing 4 tapers axially inwardly and extends substantially parallel to armplate 5 after it has deflected during assembly.

According to anther aspect of the invention shown in FIG. 3, an outer surface 22" of a flange 17" tapers radially inwardly forming an angle β with a horizontal. In this case, the plate bushing 4" can have the uniform thickness and yet extend complimentary to a deflected armplate 5a thus providing free deflection of the armplate so as to avoid locking up the tensioner.

According to the invention, each of the armplates 5, 5a is preferably made of spring steel. As a result, the plate retains a small amount of elasticity allowing the armplate to partially spring back to its initial position. As the contact surfaces of the plate bushing 4, 4" wear, the armplate is able to compensate for the wear and to keep the tensioner firmly together. Using the increased axial force of the deflected armplate made of spring steel can create damping, which is sometime desirable.

While the above disclosure has described various embodiments, it is understood that the invention is not limited thereto, and is susceptible to numerous changes and modifications as known to those skilled in the art. Therefore, this invention is not limited to the details shown and described herein, and includes all such changes and modifications as are encompassed by the scope of the appended claims.

What is claimed is:

1. A belt tensioner for tensioning an endless drive belt of a drive system, said belt tensioner comprising:
   a shaft extending along a longitudinal shaft axis and formed with an outer axial end;
   a housing mounted rotatably fixed on said shaft;
   an arm mounted pivotally on said shaft and formed with a flange extending radially outwardly from said outer axial end of said shaft;
   a spring element operatively connected to said housing and to said arm and actuating said arm to pivot in a belt-tensioning direction with respect to said housing;
   a pulley mounted on said arm for applying a tensioning force on said endless drive belt upon pivoting said arm in said belt-tensioning direction, said pulley being spaced axially apart from said upper end of said shaft;
   a flexible armplate having an inner radial edge fixedly mounted on said outer end of said shaft, said armplate extending radially outwardly from said shaft and being spaced axially outwardly from said flange of said arm; and
   an armplate bushing located between said armplate and said flange, said armplate and said armplate bushing forming a contact surface, said armplate bushing having an inner radial edge terminating radially outwardly from said inner edge of said armplate to enable a region of said armplate adjacent to said contact surface to deflect axially inwardly with respect to said shaft upon mounting said armplate on said shaft.

2. The belt tensioner defined in claim 1 wherein said inner edge of said armplate bushing is narrower than an outer edge of said armplate bushing, so that said armplate bushing is formed with a taper or said flange is formed with an outer surface juxtaposed with said armplate bushing, said armplate bushing being formed with a taper, to enable said region of said armplate adjacent to said contact surface to deflect axially inwardly with respect to said shaft.

3. The belt tensioner defined in claim 2 wherein said flange is formed with a stop and a support spaced diametrically opposite to one another and having respective inner surfaces which extend axially outwardly from said flange and parallel to said shaft axis, said armplate being a disk-shaped and extending radially between said outer axial end of said shaft and said inner surfaces of said support and stop.

4. The belt tensioner defined in claim 3 wherein said support is formed with a recess extending along an axis parallel to said shaft axis of said shaft and rotatably receiving said pulley.

5. The belt tensioner defined in claim 2 wherein said armplate is made of spring steel.

6. The belt tensioner defined in claim 2 wherein said housing is formed with an annular peripheral wall extending axially upwardly toward and terminating at a distance from an inner surface of said flange, said flange being formed with a stem extending parallel to said shaft and defining a compartment between itself and said annular peripheral wall.

7. The belt tensioner defined in claim 2 wherein said flange is formed with an outer surface juxtaposed with said armplate bushing, said flange being formed with a taper to enable said region of said armplate adjacent to said contact surface to deflect axially inwardly with respect to said shaft.

8. The belt tensioner defined in claim 6, further comprising a spring bushing extending between said inner surface of said flange and an outer radial surface of said annular peripheral wall and covering said compartment.

9. The belt tensioner defined in claim 6 wherein said compartment receives said spring element braced between said arm and said housing.

10. A belt tensioner for tensioning an endless drive belt of a drive system of a vehicle, said belt tensioner comprising:
   a shaft mounted fixedly on said vehicle and extending along a longitudinal shaft axis and formed with an outer axial end;
   a housing fixedly mounted on said shaft;
   an arm mounted pivotally on said shaft and resiliently biased in a belt-tensioning direction to apply a tensioning force on said endless drive belt, said arm having an outer radially extending surface;
   an armplate bushing coaxial with said shaft and mounted on said outer surface of said arm, said armplate bushing having:
      an inner annular edge spaced radially outwardly from said shaft and defining an inner diameter of said armplate bushing, and
      a wear surface extending radially outwardly from said inner annular edge and facing away from said arm; and
   an armplate mounted on said wear surface of said armplate bushing and having an inner annular actual contact surface pressed against said outer end of said shaft, said armplate having an inner diameter less than the inner diameter of said armplate bushing to enable a region of said armplate adjacent to said inner annular contact surface to deflect axially inwardly during assembly of said belt tensioner.

11. The belt tensioner defined in claim 10 wherein said wear surface of said armplate bushing is tapered radially inwardly to generally extend in a plane of said arm upon deflection of said region of said arm during assembly.

12. The belt tensioner defined in claim 10 wherein said arm has a flange supporting said armplate bushing and extending radially outwardly therefrom, said flange being formed with a stop and a support spaced diametrically opposite to one another and having respective inner surfaces which extend axially outwardly from said flange, said armplate being disk-shaped and extending radially from said outer axial end of said shaft towards said inner surfaces of said support and said stop.

13. The belt tensioner defined in claim 12 wherein said armplate bushing has an outer diameter equal to or greater than an outer diameter of said armplate.

14. The belt tensioner defined in claim 12 wherein said armplate and said armplate bushing terminate at a distance from said stop and said support.

15. The belt tensioner defined in claim 12 wherein said flange has an outer radially extending surface adjacent to and supporting said armplate bushing, said surface of said flange tapering radially inwardly so as to enable said armplate bushing to extend in a plane of said arm upon deflection of its region during assembly.

16. The belt tensioner defined in claim 12 wherein said support of said arm has a recess extending along a respective axis parallel to said shaft axis, said belt tensioner further comprising a pulley spaced axially apart from said housing and rotatably received in said recess so as said pulley is displaceable with said arm.

17. The belt tensioner defined in claim 10, further comprising a spring element braced against said housing and said arm so as to bias said arm in said belt-tensioning direction, said arm having an inner radially extending surface facing said spring element and spaced axially apart therefrom, so that said inner surface of said arm and said spring element form an opening therebetween.

18. The belt tensioner defined in claim 17, further comprising a spring bushing received in said opening between said spring element and said inner surface of said arm and having a contact portion which terminates radially outwardly from said spring element, said housing having an outer peripheral annular region extending axially toward and terminating at a distance from said inner surface of said arm, so as to allow said contact portion of said spring bushing to extend radially outwardly between and to be in contact with said peripheral region of said housing and said inner surface of said arm.

19. A method for assembling a belt tensioner for tensioning an endless drive belt of a drive system of a vehicle, said belt tensioner comprising:
   a housing extending along an axis and fixed to a shaft for mounting on a vehicle;
   an arm mounted pivotally on said shaft and resiliently biased in a belt-tensioning direction to apply a tensioning force to said endless drive belt, said arm having an outer radially extending surface, said method comprising the steps of:
   providing an armplate bushing with a wear surface and with an inner diameter,
   mounting said armplate bushing coaxially with said shaft on said outer surface of said arm, thereby having said armplate bushing spaced radially outwardly from said shaft;
   providing an armplate having an inner annular surface defining an inner diameter of said armplate which is less than said inner diameter of said armplate bushing;
   mounting said armplate on said armplate bushing coaxially with said shaft while pressing said inner annular surface against said shaft to allow a region of said armplate adjacent to said inner annular surface to deflect axially inwardly, thereby removing stackup clearances while avoiding a lock up of said tensioner.

20. The method defined in claim 19, further comprising the step of providing said armplate bushing with a tapered wear surface supporting said armplate and lying in a plane of said armplate upon deflection thereof.

21. The method defined in claim 19, further comprising the step of providing said flange with a tapered surface supporting said armplate and said armplate bushing and lying in a plane of said armplate and said armplate bushing upon deflection thereof.

22. The belt tensioner defined in claim 21 wherein said inner edge of said armplate bushing is narrower than an outer edge of said armplate bushing, so that said armplate bushing is formed with a taper to enable said region of said armplate adjacent to said contact surface to deflect axially inwardly with respect to said shaft.

23. A belt tensioner for tensioning an endless drive belt of a drive system, said belt tensioner comprising:
   a shaft extending along a longitudinal shaft axis and formed with an outer axial end;
   a housing mounted rotatably fixed on said shaft;
   an arm mounted pivotally on said shaft and formed with a flange extending radially outwardly from said outer end of said shaft;
   a spring element operatively connected to said housing and to said arm and actuating said arm to pivot in a belt-tensioning direction with respect to said housing;
   a pulley mounted on said arm for applying a tensioning force on said endless drive belt upon pivoting said arm in said belt-tensioning direction, said pulley being spaced axially apart from said upper end of said shaft;
   a flexible armplate having an inner radial edge fixedly mounted on said outer end of said shaft, said armplate extending radially outwardly from said shaft and being spaced axiallly outwardly from said flange of said arm; and
   an armplate bushing located between said armplate and said flange, said armplate and said armplate bushing forming a contact surface, said armplate bushing having an inner radial edge terminating radially outwardly from said inner edge of said armplate wherein said inner edge of said armplate bushing is narrower than an outer edge of said armplate bushing so that said armplate bushing is formed with a taper to enable a region of said armplate adjacent to said contact surface to deflect axially inwardly with respect to said shaft.

24. A belt tensioner for tensioning an endless drive belt of a drive system, said belt tensioner comprising:
   a shaft extending along a longitudinal shaft axis and formed with an outer axial end;
   a housing mounted rotatably fixed on said shaft;
   an arm mounted pivotally on said shaft and formed with a flange extending radially outwardly from said outer axial end of said shaft;
   a spring element operatively connected to said housing and to said arm and actuating said arm to pivot in a belt-tensioning direction with respect to said housing;
   a pulley mounted on said arm for applying a tensioning force on said endless drive belt upon pivoting said arm in said belt-tensioning direction, said pulley being spaced axially apart from said upper end of said shaft;
   a flexible armplate having an inner radial edge fixedly mounted on said outer end of said shaft, said armplate extending radially outwardly from said shaft and being spaced axially outwardly from said flange of said arm; and
   an armplate bushing located between said armplate and said flange wherein said flange is formed with an outer surface juxtaposed with said armplate bushing, said flange being formed with a taper to enable a region of said armplate adjacent to said contact surface to deflect axially inwardly with respect to said shaft.

* * * * *